United States Patent
Sathish

(10) Patent No.: US 9,280,476 B2
(45) Date of Patent: Mar. 8, 2016

(54) HARDWARE STREAM PREFETCHER WITH DYNAMICALLY ADJUSTABLE STRIDE

(71) Applicant: Oracle International Corporation, Redwood City, CA (US)

(72) Inventor: Vijay Sathish, Santa Clara, CA (US)

(73) Assignee: Oracle International Corporation, Redwood Shores, CA (US)

(*) Notice: Subject to any disclaimer, the term of this patent is extended or adjusted under 35 U.S.C. 154(b) by 106 days.

(21) Appl. No.: 14/295,878

(22) Filed: Jun. 4, 2014

(65) Prior Publication Data

US 2015/0356015 A1    Dec. 10, 2015

(51) Int. Cl.
*G06F 12/08* (2006.01)
*G06F 12/06* (2006.01)

(52) U.S. Cl.
CPC ........ *G06F 12/0862* (2013.01); *G06F 12/0623* (2013.01); *G06F 2212/6026* (2013.01); *G06F 2212/6028* (2013.01); *G06F 2212/6042* (2013.01)

(58) Field of Classification Search
CPC ..................... G06F 12/0862; G06F 2212/6028
USPC .................................................. 711/137, 220
See application file for complete search history.

(56) References Cited

U.S. PATENT DOCUMENTS

| | | | |
|---|---|---|---|
| 4,489,378 A | 12/1984 | Dixon | |
| 5,835,967 A | 11/1998 | McMahan | |
| 6,321,330 B1 | 11/2001 | Doshi | |
| 6,760,818 B2 * | 7/2004 | van de Waerdt | 711/137 |
| 7,487,297 B2 | 2/2009 | El-Essawy | |
| 7,702,857 B2 | 4/2010 | Gill | |
| 7,917,702 B2 | 3/2011 | Morrow | |
| 7,958,316 B2 | 6/2011 | Speight | |
| 2006/0248280 A1 * | 11/2006 | Al-Sukhni et al. | 711/137 |
| 2012/0005457 A1 | 1/2012 | Chen | |
| 2012/0054449 A1 * | 3/2012 | Hu et al. | 711/137 |
| 2013/0185515 A1 * | 7/2013 | Sassone et al. | 711/137 |
| 2014/0281351 A1 * | 9/2014 | Topp et al. | 711/205 |

* cited by examiner

*Primary Examiner* — Than Nguyen
(74) *Attorney, Agent, or Firm* — Meyertons Hood Kivlin Kowert & Goetzel

(57) ABSTRACT

An apparatus may include a first memory, a control circuit, a first address comparator and a second address comparator. The first memory may store a table, which may include an expected address of a next memory access and an offset to increment a value of the expected address. The control circuit may read data at a predicted address in a second memory and store the read data in a cache. The first and second address comparators may determine if a value of a received address is between the value of the expected address and the value of the expected address minus a value of the offset. The control circuit may also modify the value of the offset responsive to determining the value of the received address is between the value of the expected address and the value of the expected address minus the value of the offset.

20 Claims, 8 Drawing Sheets

*400*

| | Process A 401 | Process B 402 | Hit/Miss 403 | PLT A 404 | PLT B 405 | Stride A 406 | Stride B 407 | Cache 408 | Prefetch 409 |
|---|---|---|---|---|---|---|---|---|---|
| 411 | 0 | | M | init | | | | 0-63 | |
| 412 | 48 | -- | H | N | | | | 0-63 | |
| 413 | | 40 | H | | N | | | 0-63 | |
| 414 | | 88 | M | | init | | | 64-127 | |
| 415 | 96 | | H | N | | | | 64-127 | |
| 416 | | 136 | M | | Y | | 48 | 128-191 | |
| 417 | 144 | | H | N | | | 48 | 128-191 | |
| 418 | 192 | | M | Y | | 192 | 48 | 192-255 | |
| 419 | | 184 | H | | N | 192 | 48 | 192-255 | |
| 420 | | 232 | H | | N | 192 | 48 | 192-255 | |
| 421 | 240 | | H | N | | 192 | 48 | 192-255 | |
| 422 | | 280 | M | | Y | 192 | 144 | 256-319 | |
| 423 | 288 | | H | N | | 192 | 144 | 256-319 | |
| 424 | | 328 | M | | Y | 192 | 48 | 320-383 | |
| 425 | 336 | | H | N | | 192 | 48 | 320-383 | |
| 426 | 384 | | M | PSB | | 192 | 48 | 384-447 | 576-639 |
| 427 | | 376 | H | | N | 192 | 48 | 384-447 | |
| 428 | | 424 | H | | N | 192 | 48 | 384-447 | |
| 429 | 432 | | H | | | 192 | 48 | 384-447 | |
| 430 | 480 | | M | | | 192 | 48 | 448-511 | |
| 431 | | 472 | H | | N | 192 | | 448-511 | |
| 432 | 528 | | M | | | 192 | | 448-511 | |

| | Process A 701 | Process B 702 | Hit/ Miss 703 | PLT A 704 | PLT B 705 | Stride A 706 | Stride B 707 | Cache 708 | Prefetch 709 |
|---|---|---|---|---|---|---|---|---|---|
| 711 | 0 | | M | init | | | | 0-63 | |
| 712 | 48 | -- | H | N | | | | 0-63 | |
| 713 | | 70 | H | | N | | | 0-63 | |
| 714 | | 88 | M | | init | | | 64-127 | |
| 715 | 96 | | H | N | | | | 64-127 | |
| 716 | | 136 | M | | Y | | 48 | 128-191 | |
| 717 | 144 | | H | N | | | 48 | 128-191 | |
| 718 | 192 | | M | Y | | 192 | 48 | 192-255 | |
| 719 | | 184 | H | | N | 192 | 48 | 192-255 | |
| 720 | | 232 | H | | N | 192 | 48 | 192-255 | |
| 721 | 270 | | H | N | | 192 | 48 | 192-255 | |
| 722 | | 280 | M | | Y | 192 | 144 | 256-319 | |
| 723 | 288 | | H | N | | 192 | 144 | 256-319 | |
| 724 | | 328 | M | | Y | 192 | 48 | 320-383 | |
| 725 | 336 | | H | N | | 192 | 48 | 320-383 | |
| 726 | 384 | | M | PSB | | 192 | 48 | 384-447 | 576-639 |
| 727 | | 376 | H | | N | 192 | 48 | 384-447 | |
| 728 | | 724 | H | | N | 192 | 48 | 384-447 | |
| 729 | 432 | | H | | | 192 | 48 | 384-447 | |
| 730 | 480 | | M | | | 96 | 48 | 448-511 | 512-575 |
| 731 | | 472 | H | | N | 96 | | 448-511 | |
| 732 | 528 | | H | | | 96 | | 512-575 | 576-639 |

FIG. 7

HARDWARE STREAM PREFETCHER WITH DYNAMICALLY ADJUSTABLE STRIDE

BACKGROUND

1. Field of the Invention

The embodiments herein relate to processors and, more particularly, to implementation of data prefetch systems.

2. Description of the Related Art

To improve execution performance, a processor may include one or more levels of cache memories (commonly referred to as "caches"). A cache may be used to store frequently accessed instructions and/or memory data, and improve performance by reducing the time for the processor to retrieve these instructions and data. A processor may include a fast low/first-level (L1) cache backed by a larger, slower second-level (L2) cache. Some processors may include a high/third-level (L3) cache for further performance improvement. Processors may include multiple cores and/or cores that execute multiple software processes at a same time.

Some processors may include a prefetch buffer for a given cache to further improve memory access times. A prefetch buffer for the given cache may read data from a higher level cache or a system memory in anticipation of an upcoming request from the cache, i.e., prefetch data before the processor requests the data. A prefetch buffer may learn memory access patterns corresponding to one of more software processes running in the processor. Using these patterns, the prefetch buffer may then read data before the cache request it.

In cases in which a prefetch buffer supports more than one core or a core executing multiple software processes, the prefetch buffer may experience interference between the multiple software processes while learning memory access patterns. Memory access patterns may be overlapping, causing the prefetch buffer to recognize an incorrect pattern. In some cases, this may lead to less optimal memory prefetches and possibly increased cache misses.

SUMMARY

Various embodiments of a prefetch buffering device are disclosed. Broadly speaking, an apparatus, a system, and a method for improving system performance through prefetching cached information in a processor are contemplated, in which the apparatus may include a first memory, a control circuit coupled to the first memory, a first address comparator, and a second address comparator. The first memory may be configured to store a table, wherein the table may include a first entry, including an expected address of a next memory access and an offset to increment a value of the expected address for a subsequent memory access. The control circuit may be configured to read data at a predicted address in a second memory and store the read data in a cache memory. A value of the predicted address may be dependent upon the value of the expected address and a value of the offset. The first address comparator may be configured to compare a received address value of a received memory access to the value of the expected address. The second address comparator may be configured to compare the received address value of the received memory access to a value dependent upon the value of the expected address and the value of the offset. The control circuit may be further configured to generate a new value of the offset dependent upon an output of the first comparator and an output of the second comparator.

In a further embodiment, the control circuit may be further configured to generate the new value of the offset responsive to a determination that the received address value of the received memory access resulted in a cache miss. In still further embodiment, the control circuit may be further configured to generate the new value of the offset dependent upon the received address value minus the value of the expected address plus a current value of the offset. In another embodiment, the control circuit may be further configured to generate the new value of the offset dependent upon a value that is an integer multiple of a cache line size in the cache memory.

In one embodiment, the control circuit may be further configured to update the value for the expected address responsive to generating the new value of the offset. In another embodiment, the control circuit is further configured to update the value for the predicted address responsive to generating the new value of the offset. In an additional embodiment, the new value of the offset may be less than the value of the offset.

BRIEF DESCRIPTION OF THE DRAWINGS

The following detailed description makes reference to the accompanying drawings, which are now briefly described.

FIG. 4 is a table illustrating an embodiment of a prefetch learning sequence.

FIG. 7 is a table illustrating an embodiment of a prefetch learning sequence including a stride adjustment.

Figure 1:
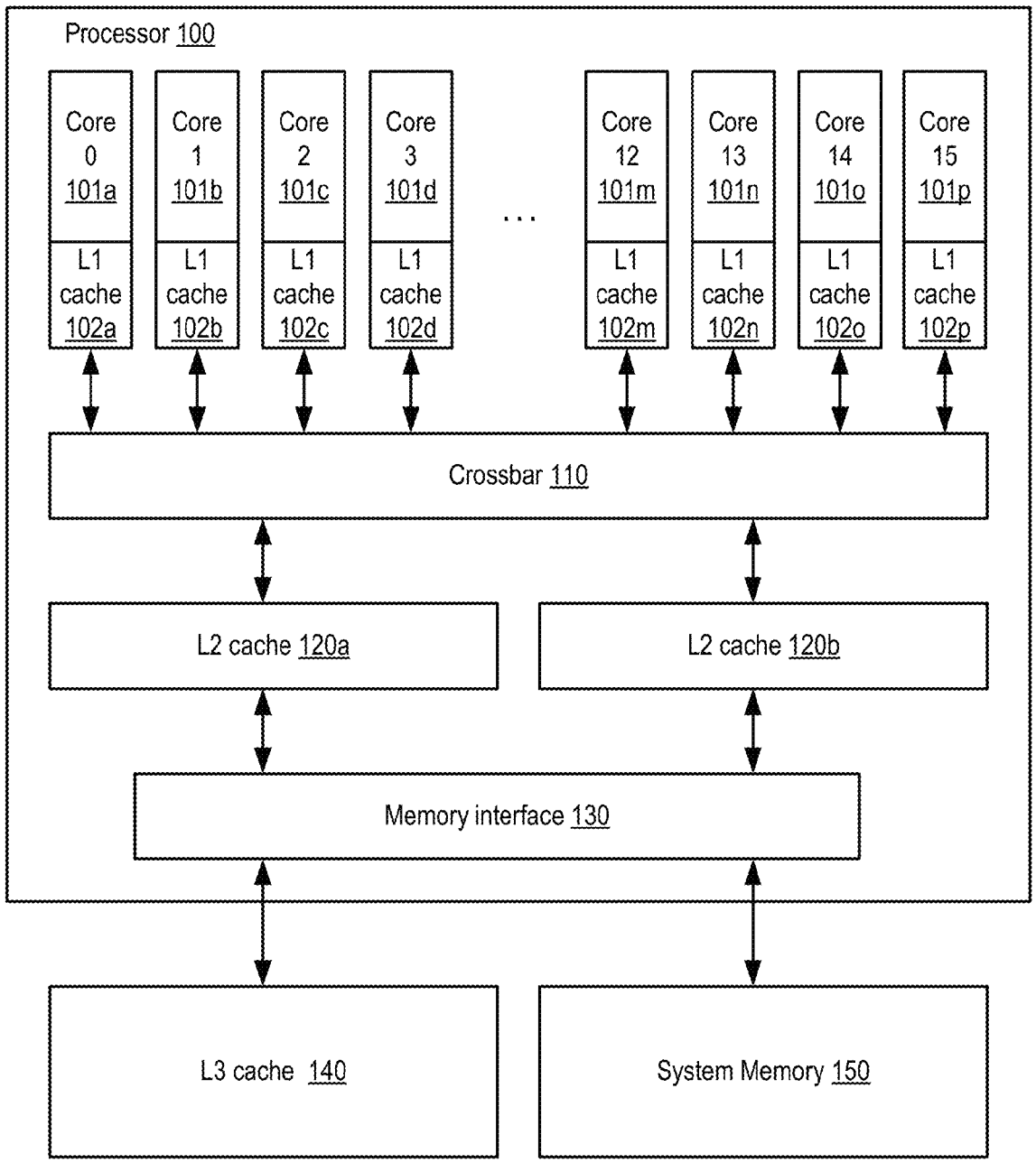
FIG. 1 illustrates a block diagram illustrating an embodiment of a multi-core processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C.

§112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

Introduction

Generally speaking, a processor core (or simply, a "core") may refer to a unit of a processor that is capable of executing program instructions and processing data independently of other processor cores within the processor, such that multiple cores may execute instructions concurrently. Performance of a processing core may be impacted by a multitude of factors, including processor clock speed, the number of cores in the processor, and speed of the memory accesses.

In some embodiments, a mechanism that may be utilized for improving the speed of the memory accesses and therefore the performance of a processing core is to have a cache memory between the processor and the memory or memories from which data and program instructions are read. Caches may improve performance of a processor by storing data and/or instructions from frequently accessed memory locations in a local memory that may have faster access times than the original memory.

A prefetch buffer may be utilized to further improve the performance and/or the efficiency of memory accesses. Working in combination with a cache memory, a prefetch buffer may improve a flow of data into a processor by anticipating which data will be required for a particular software process (also commonly referred to as a process thread) and reading this data before the processor request the data. If the prefetch buffer has accurately anticipated the processors data needs, then when the processor request data, this requested data may be available and used by the processor with little to no delay.

Various embodiments of prefetch buffers and methods to manage the prefetching operations are discussed in this disclosure. The embodiments illustrated in the drawings and described below may provide techniques for managing the operations of a prefetch buffer in a computing system that may improve the efficiency and/or performance of memory operations in a processor.

In some embodiments, a prefetch buffer may support more than one core or a core may execute multiple software processes. In such embodiments, the prefetch buffer may experience interference between the multiple software processes while learning memory access patterns. For example, a first software process may access a memory at a particular address value and a second software process may access the same memory at a different, but close address value. A prefetch buffer in the process of learning a new memory access pattern may mistake the two memory accesses as originating from a single software process, causing the prefetch buffer to recognize an incorrect pattern. In some cases, this may lead to less optimal memory prefetches and possibly increased cache misses.

A method for correcting a memory pattern that has been misinterpreted by a prefetch buffer is contemplated. Such a method should require minimal impact to circuit sizes and power consumption when implemented in a system. Devices and methods are presented herein that may help correct an incorrectly learned memory access pattern within a prefetch buffer.

Multicore Processor Overview

In various embodiments, a multicore processor may include a number of instances of a processing core, as well as other features. One example of an 16-core processor is depicted in FIG. 1. In the illustrated embodiment, processor 100 may include sixteen instances of a core, denoted as cores 101a-p and also designated "core 0" though "core 15," although for clarity, not all instances are shown in FIG. 1. Cores 101a-p may each include local L1 cache 102a-p. Cores 101a-p may be coupled to L2 caches 120a and 120b through crossbar 110. In addition, cores 101a-p may be coupled to memory interface 130 through L2 caches 120a-b. Memory interface 130 may be further coupled to L3 cache 140 as well as system memory 150. It is noted that in various embodiments, the organization of FIG. 1 may represent a logical organization rather than a physical organization, and other components may also be employed. For example, in some embodiments, cores 101a-p and L2 caches 120a-b may not connect directly to crossbar 410, but may instead interface with the crossbar through intermediate logic. L3 cache 140 and system memory may reside external to processor 100.

Cores 101a-p may be configured to execute instructions and to process data according to a particular Instruction Set Architecture (ISA). In one embodiment, cores 101a-p may be configured to implement the SPARC® V9 ISA, although in other embodiments it is contemplated that any desired ISA may be employed, such as x86, PowerPC® or MIPS®, for example. Additionally, as described in greater detail below, in some embodiments each instance of core 101 may be configured to execute multiple threads concurrently, where each thread may include a set of instructions that may execute independently of instructions from another thread. In various embodiments it is contemplated that any suitable number of cores 101a-p may be included within a processor, and that cores 101a-p may concurrently process some number of threads.

L1 caches 102a-p may reside within cores 101a-p or may reside between cores 101a-p and crossbar 110. L1 caches 102a-p may be configured to cache instructions and data for use by their respective cores 101a-p. In some embodiments, each individual cache 102a-p may be implemented using set-associative or direct-mapped techniques. For example, in one embodiment, L1 caches 102a-p may be 13 kilobyte (KB) caches, where each L1 cache 102a-p is 2-way set associative with a 13-byte line size, although other cache sizes and geometries are possible and contemplated.

It is noted that an entry in a cache may be referred to as a cache line. Each cache line in a cache may include the data being stored, flags corresponding to the coherency state, and an address tag. A cache tag may include all or a part of the original address of the data being stored in the cache line, an index indicating in which cache line the cached data is stored, and an offset indicating where in each cache line the specific data is located. A given processor core may access a cache with a direct address of the memory location, a translated address based on lookup tables, or through an address calculated based on an instruction's address mode.

Crossbar 110 may be configured to manage data flow between cores 101a-p and the shared L2 caches 120a-b. In one embodiment, crossbar 110 may include logic (such as multiplexers or a switch fabric, for example) that allows any core 101a-p to access any bank of L2 cache 120a-b, and that conversely allows data to be returned from any bank of L2 cache 120a-b to any core 101a-p. Crossbar 110 may be configured to concurrently process data requests from cores 101a-p to L2 cache 120a-b as well as data responses from L2 cache 120a-b to cores 101a-p. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 101a-p attempt to access a single bank of L2 cache 120a-b or vice versa. It is noted that in various embodiments, crossbars 110 may be implemented using any suitable type of interconnect network, which, in some embodiments, may correspond to a physical crossbar interconnect.

L2 caches 120a-b may be configured to cache instructions and data for use by cores 101a-p. L2 cache 120a may be coupled to cores 101a-h and L2 cache 120b may similarly be coupled to cores 101i-p. As the number of cores 101 is increased, the size and/or number of L2 caches 120 may also be increased in order to accommodate the additional cores 101. For example, in an embodiment including 16 cores, L2 cache 120 may be configured as 2 caches of 3 MB each, with each cache including 8 individual cache banks of 384 KB, where each bank may be 24-way set associative with 256 sets and a 13-byte line size, although any other suitable cache size or geometry may also be employed.

In some embodiments, L2 caches 120a-b may include various queues and buffers configured to manage the flow of data to and from crossbar 110 as well as to and from L3 cache 140. For example, such embodiments of L2 cache 120a-b may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). In some embodiments, multiple banks of L2 cache 120 may share single instances of certain data structures or other features. For example, a single instance of a fill buffer may be shared by multiple banks of an L2 cache 120 in order to simplify the physical implementation (e.g., routing and floorplanning) of L2 cache 120a-b. Despite this sharing, individual banks of L2 caches 120a-b may be configured to concurrently and independently process accesses to data stored within the banks when such concurrency is possible.

Like L1 caches 101a-p and L2 caches 120a-b, L3 cache 140 may be configured to cache instructions and data for use by cores 101a-p. In some embodiments, L3 cache may be implemented on a separate memory chip external to processor 100 and accessed through memory interface 130. In other embodiments, L3 cache may be implemented on the same die as processor 100, in which case, L3 cache 140 may be accessed directly. Similar to L1 caches 102a-p, L3 cache 140 may be implemented using set-associative or direct-mapped techniques. For example, in one embodiment, L3 cache 140 may be an 8 megabyte (MB) cache, where the 8 MB bank is 16-way set associative with a 13-byte line size, although other cache sizes and geometries are possible and contemplated.

The cache hierarchy may be established such that any core 101 may first access its respective L1 cache 102. If the access to L1 cache 102 is a miss, then the respective L2 cache 120 may be accessed. If the L2 cache 120 access is a miss, then L3 cache 140 may be accessed next. If all three cache levels miss, then system memory 150 may be accessed through memory interface 130.

Memory interface 130 may be configured to manage the transfer of data between L2 caches 120a-b and L3 cache 140 or system memory 150 in response to L2 fill requests and data evictions, for example. In some embodiments, multiple instances of memory interface 130 may be implemented, with each instance configured to control a respective bank of L3 cache 140 or system memory 150. Memory interface 130 may be configured to interface to any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of memory, such that L3 cache 140 and system memory 150 may be composed of two or more of the listed types.

It is noted that FIG. 1 is merely an example of a multicore processor. In other embodiments, processor 100 may include network and/or peripheral interfaces. The physical structure may not be represented by FIG. 1 as many other physical arrangements may be possible and are contemplated.

Processor Core with Prefetch Buffer

Figure 2:
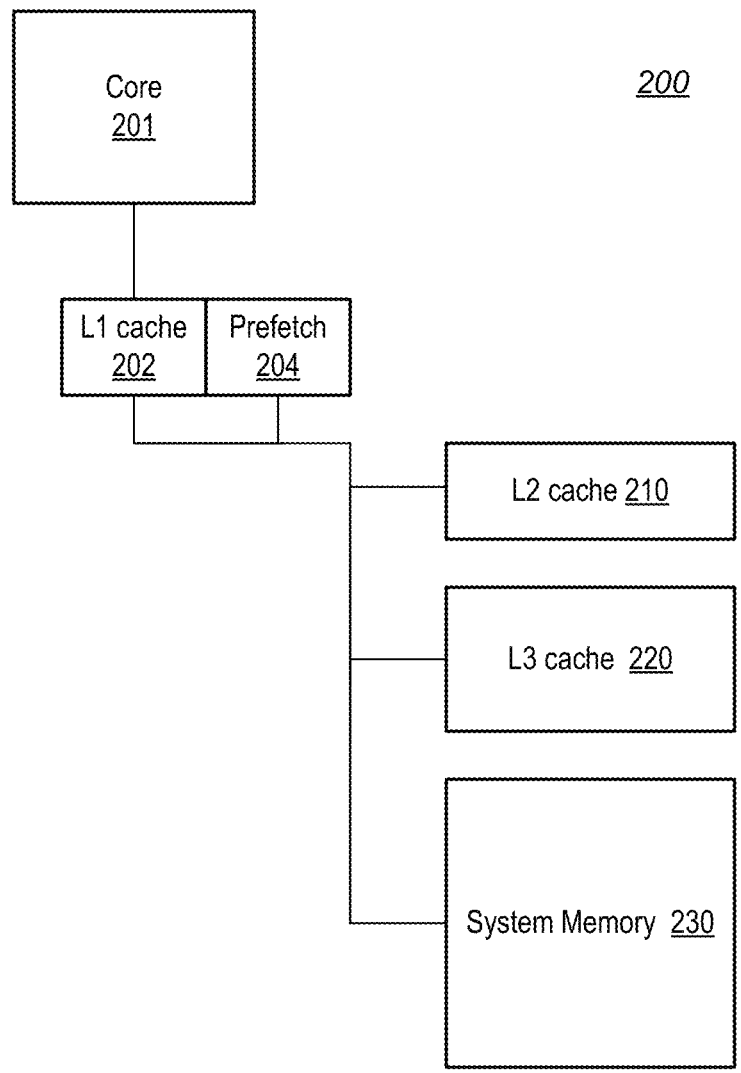
FIG. 2 is a block diagram illustrating an embodiment of a processor memory path.

Turning to FIG. 2, an embodiment of a processor core with a prefetch buffer is illustrated. System 200 may correspond to a portion of processor 100 as illustrated in FIG. 1. Core 201 may correspond to a given core 101 in FIG. 1, and may therefore function as described above in relation to cores 101a-p. Core 201 may be coupled to L1 cache 202 which may correspond to a respective L1 cache 102 in FIG. 1. L1 cache 202 may be coupled to prefetch unit 204, L2 cache 210, L3 cache 220 and system memory 230.

L1 cache 202 may provide a fast memory access to core 201 and may therefore be the first memory accessed by core 201 when core 201 needs to access a memory location. L1 may function as per the description above in regards to L1 caches 102a-p. L1 cache 202 may include multiple cache lines and may assign a given line or set of lines to a respective processing thread executing in core 201. In addition, L1 cache 202 may operate in combination with prefetch unit 204 to provide data to core 201. When a cache miss occurs in L1 cache 202, then L1 cache 202 may look for the data in L2 cache 210, followed by L3 cache 220, and then in system memory 230.

Prefetch unit 204 may read data from L2 cache 210, L3 cache 220, and in system memory 230 in anticipation of core 201 requesting the data. The read data may be stored in one or more cache lines in L1 cache 202. In some embodiments, the read data may be buffered within prefetch unit 204 before being stored in L1 cache 202. In other embodiments, the read data may be stored directly to L1 cache 202. To know which data to read, prefetch unit 204 may detect patterns in memory accesses for corresponding values of a program counter (PC) of core 201. Control circuitry, which in some embodiments may include a prefetch learning table (PLT), may monitor addresses of memory accesses and the value of the PC when these accesses are made. By tracking the memory address accessed at a certain PC value, the control circuitry may establish a pattern such as, for example, when the PC equals 'X', a memory access is made to an address equal to the address of the previous memory access plus an offset of 'Y'. Once this pattern has been established, prefetch unit 204 may read a memory location corresponding to the previous address plus 'Y' whenever the PC approaches 'X'.

L2 cache 210, L3 cache 220 and system memory 230 may be similar to the descriptions of the corresponding memories in FIG. 1. These three memories may be composed of any suitable type of memory as disclosed herein and may be of the same type or may be any combination of types. In various embodiments, all three memories may be included on a single processor die along with core 201, cache 202 and prefetch unit 204, or system memory 230 may be on a different die or both system memory 230 and L3 cache 220 may be on different dies. In some embodiments, L2 cache 210, L3 cache 220 and system memory 230 may all be on different dies from core 201.

It is noted that the system of FIG. 2 is merely an example and functional blocks are limited to emphasize the functionality of a prefetch unit. In other embodiments, more functional blocks may be included. In other embodiments, L3 cache 220 may be omitted.

Figure 3:
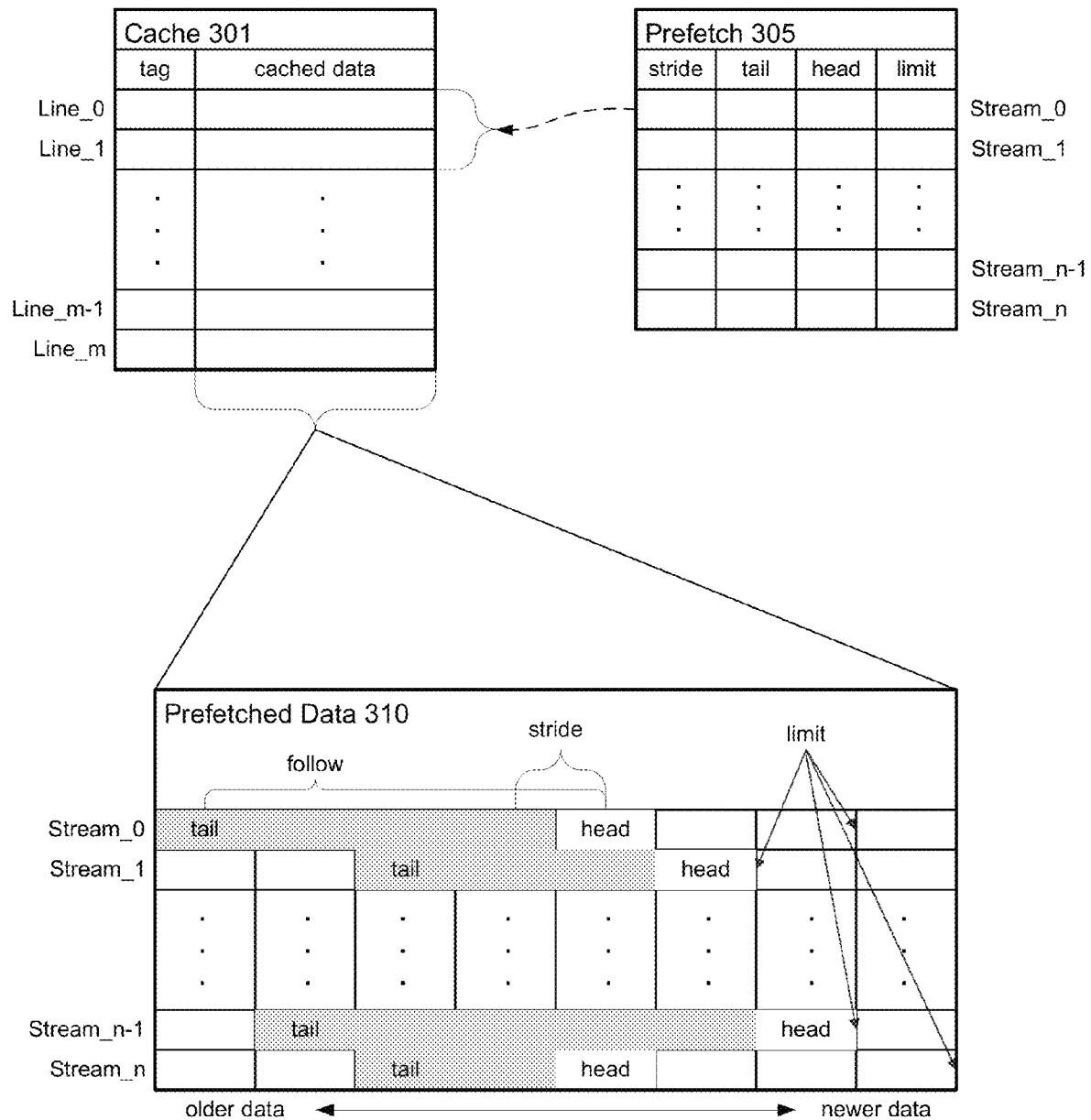
FIG. 3 illustrates an embodiment of data tables associated with a cache and a prefetch buffer.

Moving to FIG. 3, illustrations of a cache memory table and prefetch buffer tables are shown. Cache table 301 may illustrate a logical representation of how data is organized within a cache memory such as, for example, L1 cache 202 in FIG. 2. Prefetch buffer table 305 may show the organization of control values for a prefetch unit, such as, for example, prefetch unit 204 in FIG. 2. Prefetched data table 310 may illustrate more detail regarding the organization of the prefetched data in cache table 301.

Cache table 301 may be organized into multiple cache lines as indicated by line_0 through line_m, with each line including data and a tag. Each line may hold one or more bytes of data corresponding to range of memory addresses. The cached data may include data prefetched by prefetch unit 204. The cache line tag may include information regarding the data, including references to the original address of the data in a system memory. Additional information may include coherency information in relation to other memories in which the same data may be stored and/or the type of information stored, such as instructions or data.

Prefetch buffer 305 may also be organized into multiple lines as indicated by stream_0 through stream_n. Each buffer stream may store fetched data for a corresponding software thread. A given stream may include associated values for managing the data in the stream. These stream management values may be set and updated individually such that streams are managed independently. A stride value may indicate an address offset for each data fetch. For example, if data from consecutive addresses is to be read, then the stride may equal '1' to offset the address by '1' for each prefetch of the stream. In another example, only every seventh address may be read, in which case the stride may be set to '7'. In some embodiments, a stride value may have a negative value such that successive data fetches may occur at address values with a negative offset from the previous data fetch. For example, a stride of '−4' may instruct prefetch unit 204 to fetch data at a starting address and decrementing to every fourth smaller address value.

A tail pointer may be included which may indicate the address corresponding to the oldest data (also referred to herein as the "tail data") in the stream and may be the next address expected to be accessed by the corresponding software thread. Another value for managing the data may be a head pointer. A head pointer may indicate the address for the next data prefetch in the stream. A follow pointer may indicate how many data accesses ahead the head pointer is from the tail pointer. The follow pointer may be a value stored in prefetch buffer 305 or the follow pointer may be determined from a combination of the head pointer, tail pointer and stride value. A head limit may be included, which may limit how far ahead the head pointer may be from the tail pointer, or, in other words, may indicate a maximum allowable value for the follow pointer.

An example of prefetch buffer data management may be shown in prefetched data table 310. Prefetched data table 310 may correspond to cached data in cache table 301. Each column in prefetched data table 310 may represent one data value per stream. A shaded box in a column may represent a data value currently stored in the corresponding stream. For this example, one data value may correspond to one byte of data, although a data value may be any suitable size of data, such as 16 bits, 32 bits, etc. For each illustrated stream, data may be stored starting in columns on the left and moving to columns on the right. Therefore, the tail pointer represents, or "points to," the oldest stored data in a given stream. It is noted that the tail data is not always in the left-most column. This may be done for various reasons, such as, for example, to align bytes of data to 32-bit words such that bytes with addresses ending in '0', '4', 8, or '$C' are always in the left-most column of each 32-bit word. This byte alignment could vary for each stream or may be consistent across each buffer stream. Other embodiments may not include such data alignment and may always store the tail data in the left-most column.

Continuing with the example of prefetched data table 310, the head pointer for each stream may correspond to the first available buffer location to the right of the last fetched data byte. It is noted that the boxes indicating the head pointer are not shaded since the data the head pointer addresses has not yet been fetched. The stride value may be added to the address of the last fetched data to generate a next address for the head pointer. The follow pointer may indicate a number of data values are between the tail pointer and the head pointer. In some embodiments, the follow pointer may represent a number of bytes, in other embodiments, the follow pointer may represent a number of accesses (if data is fetched in bytes, this would be the same). The head limit may indicate how many more prefetches may be executed for a given stream before the buffer stream is full.

In the illustration of prefetched data table 310, stream_1 and stream_n−1 have reached the head limit. In some embodiments, a stream reaching the head limit may cease prefetching and wait for a processor, such as core 201 in FIG. 2, to request the data at the tail pointer, at which point prefetch unit 204 may increment the tail pointer by the stride value and fetch the next data pointed to by the head pointer. In other embodiments, data corresponding to the tail pointer may be evicted without waiting for the data to be requested by core 201, and then the next data may be fetched. In the illustrated embodiment, stream_0 of prefetch buffer 305 is shown to manage the data in cache lines line_0 and line_1. In some embodiments, one buffer stream may fetch enough data to fill more than one cache line at a given time. In other embodiments, one buffer stream may fetch less data than one cache line.

It is noted that the tables of FIG. 3 are merely an example. In other embodiments, additional information may be included in cache table 301 or prefetch buffer 305. The tables of FIG. 3 are not intended to represent a physical arrangement of data stored in a cache or a prefetch buffer, but instead, are intended to merely illustrate a logical organization of data that may be included.

Moving now to FIG. 4, a table representing an embodiment of a prefetch table learning sequence is illustrated. The data in table 400 may relate to a prefetch unit such as, for example, prefetch unit 204 in FIG. 2. Referring collectively to system 200 of FIG. 2 and FIG. 4, table 400 may consist of several columns as described below and several rows, each row corresponding to a memory access by one of two software processes. Table 400 may illustrate how two or more software processes may interfere with the prefetch pattern of prefetch unit 204.

Table 400 includes column process A 401, which may list addresses for memory accesses by a first software process running on a processor core such as, for example, core 201 in FIG. 2. The column labeled process B 402 may list addresses for memory accesses by a second software process running on a processor core. Process B 402 may run on the same processor core as process A, i.e., core 201, or in other embodiments may run on a separate core. Table 400 includes column hit/miss 403, which may indicate if the address from process A 401 or process B 402 is a cache hit or a cache miss in a cache memory supporting both process A and process B, such as, for example, L1 cache 202. The columns PLT A 404 and PLT B 405 may indicate if the memory access by process A or process B, respectively, results in an entry in a prefetch learning table (PLT). Columns stride A 406 and stride B 407 may list a value of a stride parameter once a memory pattern begins to develop. Table 400 may also include column cache 408 which may show current memory addresses for which data is stored in one or more cache lines associated with process A 401 and process B 402. Prefetch 409 is a column which may indicate a range of memory addresses being prefetched for L1 cache 202. Both process A 401 and process B 402 may have a memory access pattern in which every 48$^{th}$ memory address is accessed, starting at address 0 for process A 401 and at 40 for process B 402. Process B 402 may begin after process A 401 has initiated one or more memory requests.

Process A 401 may generate a first memory access to address 0 as shown in row 411. This memory access may result in a cache miss in L1 cache 202 as shown by hit/miss 403 and may instigate a new entry in a prefetch learning table in prefetch unit 204 as indicated by PLT A 404. L1 cache 202 may read addresses 0-63 from one of L2 cache 210, L3 cache 220 or system memory 230 and store the data corresponding to these addresses in at least one cache line 406 in response to the cache miss as indicated by cache 406. Next, in row 412, process A 401 may access memory address 48 which may result in a cache hit and no entry in PLT A 404. In row 413, process B 402 may generate a memory access to location 40 which may result in a cache hit and no entry into PLT B 405. Process B 402 may access memory location 88 in row 414, which may result in a cache miss and initiate a first entry by prefetch unit 204 into PLT B 405. In response to the miss, L1 cache 202 may read and store locations 64-127 as shown in cache 408.

In row 415, process A 401 may access location 96 which may have just been stored in L1 cache 202, resulting in a cache hit and no entry in PLT A 404. Process B 402 in row 416 may access location 136, which may result in another miss and a second entry in PLT B 405. With the second entry in PLT B 405, prefetch unit 204 may initialize stride B 407 to the value of the address of the second entry (136) minus the address of the first entry (88), i.e., stride B 407 may be set to 48. A prefetch buffer stream, however, may not be established until a third PLT B 405 entry occurs with the same value for stride B 407. In response to the cache miss, L1 cache 202 may read and store locations 128-191.

In some embodiments, each PLT (i.e., PLT A 404, PLT B 405, etc.) may store only a single entry. The single entry may initially include data representing the first address of the memory access by a corresponding process that resulted in the PLT entry. On a subsequent cache miss of the corresponding process, the single entry may be updated to include data representing a value of a second memory access and a value of a stride between the first and second addresses.

Process A 401 may access location 144 in row 417, which may be a cache hit with no PLT 404 entry. Process A 401 may make another access to location 192 in row 418, which may result in a cache miss. Prefetch unit 204 may make a second entry into PLT A 404 and may initialize stride A 406 to 192 (address of second miss at 192 minus address of first miss at 0). L1 cache 202 may read and store data from locations 192-255. In row 419, process B 402 may access location 184 and in row 420 process B 402 may access location 232. Both accesses may be cache hits and no PLT B 405 entry may be made. Process A 401 may follow, in row 421, with an access to location 240 which may also be a cache hit and result in no entry into PLT A 404.

In row 422, process B 402 may access location 280 which may result in a cache miss and another entry in PLT B 405. Stride B 407, however, may be changed to 144 (address 280–address 136). The change in stride B 407 may cause prefetch unit 204 to wait for another PLT entry with a stride B 407 of 144 before establishing a prefetch buffer stream for process B 402. L1 cache 202 may read and store data from locations 256-319. In row 423, process A 401 may access location 288, resulting in a cache hit and no PLT A 404 entry. In row 424, however, process B 402 may access location 328, resulting in a cache miss and an entry into PLT B 405. Stride B 407 may be set back to 48 (328–280), which may cause prefetch unit 204 to wait again for stride B 407 to have a same value for two PLT B 405 entries in a row before establishing a prefetch buffer stream. In other embodiments, the number of PLT B 405 entries that prefetch unit 204 may wait before establishing a prefetch buffer stream may be different than two. L1 cache 202 may read and store data from locations 320-383.

Process A 401 may access location 336 in row 425, resulting in a cache hit and then follow with an access to location 384 which may result in a cache miss. Another PLT A 404 entry may be made and prefetch unit 204 may calculate stride A 406 to be 192, same as the stride A 406 value calculate in the previous PLT A 404 entry. Since two consecutive PLT A 404 entries have the same stride A 406 value, prefetch unit 204 may configure a prefetch stream buffer with a stride value of 192. As part of configuring the prefetch stream buffer, prefetch unit 204 may clear PLT A 404 entries since a pattern has been recognized and the prefetch stream buffer has been configured and activated. In response to the cache miss, L1 cache 202 may read and store data from locations 384-447. In addition, prefetch unit 204 may prefetch data from locations 576-639 based on the calculated stride value of 192.

In rows 427 and 428, process B 402 may access locations 376 and 424, respectively, and both accesses may result in cache hits. Process A 401 may access location 432 in row 429, which may also result in a cache hit. In row 430, process A 401 may access location 480, which may be between the last cached memory locations and the prefetched memory locations, and may therefore result in a cache miss. Since the prefetch stream buffer has been activated in response to process A 401 memory accesses, prefetch unit 204 may not create a PLT A 404 entry. Responsive to the cache miss, L1 cache 202 may read and store data from locations 448-511. Process B 402 may access location 472 in row 431, which may result in a cache hit. Prefetch unit 204 may clear PLT B 405 entries associated with process B 402 after several cache hits. In row 432, process A 401 may access location 528, which may result in another cache miss.

It is noted that with the stride set to 192, process A 401 and process B 402 may continue to generate cache misses. A continuation of cache misses may have a negative impact to system performance. If the stride value were to be adjusted to accommodate the actual strides of process A 401 and process B 402, then system performance might be improved.

It is also noted that the table of FIG. 4 is merely an example to demonstrate interfering memory accesses when using a memory prefetch pattern. Various other interfering access patterns are known and contemplated. In other embodiments, a cache miss may not occur for many memory accesses after the access pattern has been learned. It is also noted that when two or more software processes access memory addresses in close proximity to each other, the memory accesses may or may occur with a same address increment as shown in FIG. 4. Additionally, the address values between successive memory accesses were shown to be positive, i.e., increment, in FIG. 4. In other embodiments, the address values of successive memory accesses may be negative, i.e., decrement.

Figure 5:
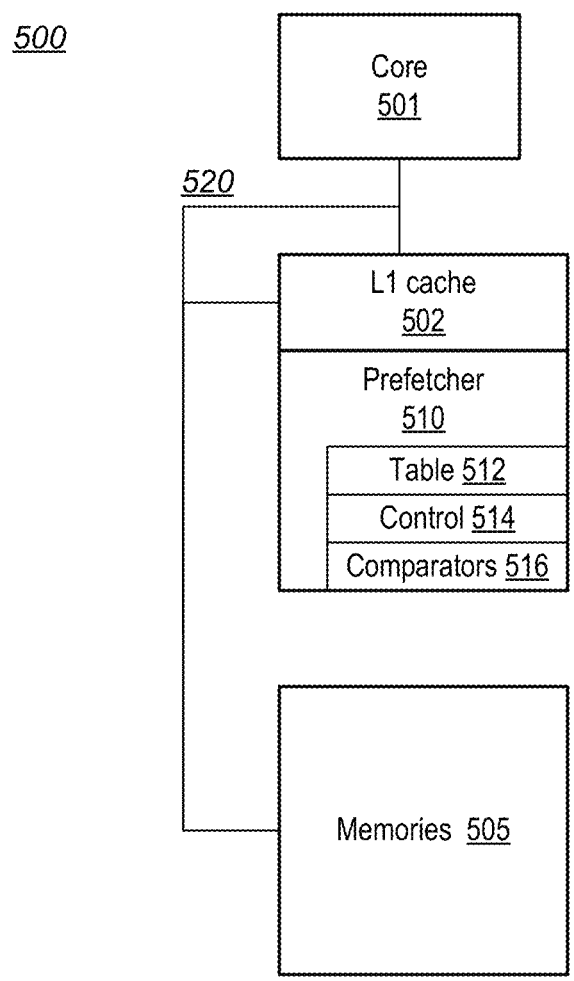
FIG. 5 is a block diagram illustrating an embodiment of a prefetch unit in a processor.

Turning now to FIG. 5, another embodiment of a processor core with a prefetch buffer is illustrated. System 500 may correspond to a portion of processor 100 as illustrated in FIG. 1. Core 501 may correspond to a given core 101 in FIG. 1, and may therefore function as described above in relation to cores 101a-p. Core 501 may be coupled to L1 cache 502 which may correspond to a respective L1 cache 102 in FIG. 1. L1 cache 502 may be coupled to prefetcher 510, and memories 505.

Similar to L1 cache 102, L1 cache 502 may provide a fastest memory access for core 501. L1 cache 502 may access memories 505 via bus 520 in the event of a cache miss in L1 cache 502. L1 cache 502 may function in conjunction with prefetcher 510 to prefetch data into L1 cache 502 before the data is requested by core 501.

Prefetcher 510 may correspond to prefetch unit 204 in FIG. 2 and therefore may perform similar functions as described in regards to prefetch unit 204. Prefetcher 510 may include buffer table 512, control logic 514, and comparators 516. Buffer table 512 may correspond to prefetch buffer 305 in FIG. 3 and may therefore include control values for multiple buffer streams. Comparators 516 may each include one or more comparator circuits for each stream to compare an address of a memory access to one or more values in buffer table 512.

Prefetcher 510 may detect patterns in memory accesses by core 501, as described above in regards to table 400 in FIG. 4, and may read memories 505, predicting the upcoming memory locations that will be accessed by core 501. Control unit 514 may include circuitry for detecting the memory access patterns as well as circuitry for predicting upcoming memory accesses. Upon reading memories 505, prefetcher 510 may store the read data in one or more cache lines of L1 cache 502 or, in some embodiments, may store the read data in buffer table 512. When core 501 request data from a memory location successfully predicted by control unit 514, the data may already be in L1 cache 502 and core 501 receives the data from L1 cache 502. After core 501 reads the data from L1 cache 502, prefetcher 510 may read more data from memories 505. Prefetcher 501 may determine a new address from which to fetch data by adding the address of the last fetch to an offset, i.e., a stride value, determined by the prefetch learning table. As shown above in FIG. 4, a capability to adjust the stride value after a prefetch learning sequence has completed might have a positive impact to system performance.

To help detect when a stride value may be modified for efficiency, prefetch unit may include comparators 516. Comparators 516 may be used to determine when the address of a cache miss occurs within a certain range of addresses. In some embodiments, prefetcher 510 may look for addresses of cache misses that are less than an address in a tail pointer of a prefetch stream and greater than the address in the tail pointer minus the current stride value. Such an occurrence may be indicative of a stride value that has been set too large due to interference between memory accesses from two or more processes. Comparators 516 may consist of at least two address comparators, one comparator set to compare a received address to an address in a tail pointer and another comparator to set to compare the received address to a value equal to the address in the tail pointer minus the current stride value.

Comparators 516 may be implemented by any suitable digital comparator circuit. A digital comparator circuit may receive two binary values, A and B, and determine which of these three conditions are true: A is greater than B, B is greater than A, or A is equal to B, by performing a bitwise comparison of the bits included in the binary values A and B. Digital comparators may be designed to receive values of A and B of any suitable bit length, including a bit length equal to a length of an address value. In some embodiments, a digital comparator may have a single output, which may be programmed to assert in response to any of the three conditions listed or some combinations of the three conditions. In other embodiments, each condition may have a separate output.

In some embodiments, both positive and negative stride values may be supported. In such embodiments, comparators 516 may switch between greater than and less than comparisons dependent upon the stride value. For example, if the stride is positive, then a first comparator may assert a signal if the received address is less than the address in the tail pointer and a second comparator may assert a signal if the received address is greater than the address in the tail pointer minus the stride value. If the stride value is negative in the example, then the first comparator may assert the signal if the received address is greater than the address in the tail pointer and the second comparator may assert the signal if the received address is less than the address in the tail pointer minus the (negative) stride value.

In some embodiments, comparators 516 may compare every address received by prefetcher 510. In other embodiments, comparators 516 may only be active in response to a cache miss of an address received by prefetcher 510. If prefetcher 510 supports multiple buffer streams, then a given set of comparators 516 may only be active in response to addresses associated with the respective buffer stream.

It is noted that the system of FIG. 5 is merely an example and functional blocks are limited to emphasize the functionality of a prefetch buffer. In other embodiments, more functional blocks may be included. In other embodiments, memories 505 may include several different memory modules, including additional caches.

Figure 6:
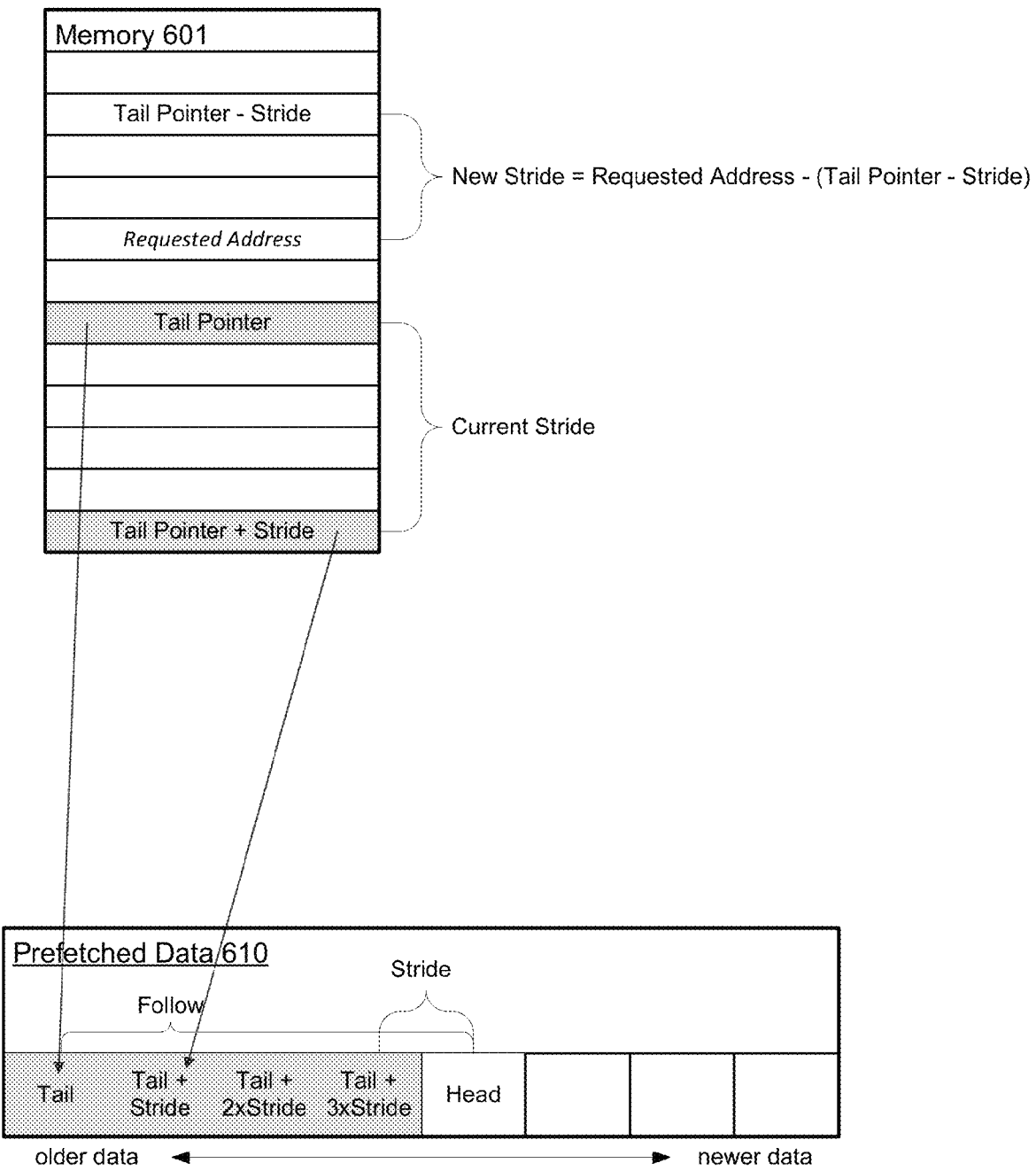
FIG. 6 illustrates an embodiment of data organization associated with a prefetch buffer.

Moving on, FIG. 6 illustrates an embodiment of data organization associated with a prefetch buffer, such as, for example, prefetcher 510 in FIG. 5. FIG. 6 includes memory 601 and prefetched data 610. Memory 601 may represent an address table for a portion of data from a memory such as memories 505 in FIG. 5, from which data may be prefetched. Prefetched data 610 may represent data that has been fetched by prefetcher 510 and stored in a buffer such as L1 cache 502. One block within memory 601 or prefetched data 610 may represent data from one memory address or data from a range of addresses, including enough data to fill one or more cache lines. It is noted that memory 601 and prefetched data 610 are logical representations of an embodiment of data organization and are not intended to illustrate physical arrangement of data.

Referring to system 500 of FIG. 5 and the data tables in FIG. 6, memory 601 may illustrate a logical arrangement of data being prefetched from memories 505 by an active software process. Prefetched data 610 may illustrate the fetched data stored in L1 cache 502. Prefetched data 610 may include data from the address referenced by the tail pointer as well as data from the tail pointer plus the stride, the tail pointer plus two times stride, and the tail pointer plus three times the stride. In this example, a new software process or a change in the memory access pattern of the active software process may result in periodic or occasional cache misses, as demonstrated above in the description of FIG. 4.

Core 501 may request data from an address less than the address stored in the tail pointer due to the current stride value. Prefetcher 510 may determine if the stride value is adjustable by comparing the requested address to the address value in the tail pointer and to an address value equal to the tail pointer minus the stride. In other words, prefetcher 510 may determine if the requested address is within one "stride" of the tail pointer. If prefetcher 510 determines that the requested address is between these two values, then prefetcher 510 may set the stride to a new value as shown in Equation 1.

$$\text{new stride} = \text{requested address} - (\text{tail pointer} - \text{current stride}) \quad (1)$$

The new value for the stride may be used for the next data prefetch operation by prefetcher 510. In some embodiments, the data previously fetched, (i.e., the tail pointer plus the stride, the tail pointer plus two times stride, and the tail pointer plus three times the stride) may be evicted from L1 cache 502 or marked as invalid. In other embodiments, this prefetched data may be maintained while new data prefetches are stored in other cache lines of L1 cache 502.

The two tables of FIG. 6 are merely embodiments of a logical representation of data organization to demonstrate prefetching concepts. It is noted that while the example of FIG. 6 assumed a positive value for the stride, any suitable stride value, either positive or negative, may be employed.

Turning now to FIG. 7, the prefetch table learning sequence from FIG. 4 may be revisited. In this example, the prefetch learning sequence may be applied to system 500 in FIG. 5. Columns 701 through 709 may correspond to columns 401 through 409 in FIG. 4. Rows 711 through 729 may correspond to rows 411 through 429 in FIG. 4.

Refer to FIG. 4 above for the descriptions of rows 711 through 729. By the end of the memory access of row 726, a memory access pattern of process A 701 may have been learned with a value of stride A 706 set to 192 and any associated data in the PLT A 404 now deleted. In row 730, a memory access by process A 701 may occur to memory location 480. This memory access may result in a cache miss due to prefetcher 510 prefetching memory locations 576-639 based on the current value (192) of stride A 706. In response to the cache miss, prefetcher 510 may compare the value of the requested address to the address value in the tail pointer and to a value equal to the tail pointer address minus the stride value. In this example, the requested address is 480, the tail pointer address is 576 and the stride is 192. The requested address of 480 is, therefore between 576 and 384 (576−192). Prefetcher 510 may determine that stride A 706 can be adjusted to a new value. Using Equation 1, the new stride A 706 may be calculated as illustrated in equation 2.

$$\text{new stride} = 480 - (576 - 192) = 96 \quad (2)$$

L1 Cache 502 may read and store data from memory locations 448-511 due to the cache miss. The tail pointer may be set to the first address of the newly cached data, i.e., 448 in this example. Prefetcher 510 may then prefetch data from memory addresses 512-575 based on the new values of the tail pointer and stride A 706 (i.e., 448+96), store the data in L1 cache 502, and update the tail pointer to 512.

In row 731, process B 702 may request data from address 472 which may be a cache hit. Process A 701 may, in row 732, access address 528 which may result in a cache hit. Prefetcher 510 may prefetch the next data from addresses 576-639. In some embodiments, the memory access of row 732 may result in a cache miss if latency in reading and storing the data from locations 512-575 results in the data not being stored in L1 cache 502 by the time process A 701 accesses location 528. In such an embodiment, the tail pointer may be set to 576 for the next prefetch and prefetcher 510 may adjust the stride value again. Using Equation 1, the new stride A 706 may be calculated as illustrated in equation 3.

$$\text{new stride} = 528 - (576 - 96) = 48 \quad (3)$$

Similar to FIG. 4, it is noted that the table of FIG. 7 is merely an example to demonstrate a correction process for the stride value. The increment between address values of successive memory accesses were shown to be positive in FIG. 7. In other embodiments, the increment between address values of successive memory accesses may be negative, as well as positive. Also, the stride values for both process A 701 and process B 702 were shown to be the same for clarity of the example. In other examples, interfering processes may have different stride values.

Method for Adjusting a Stride Value in a Prefetch Buffer

Figure 8:
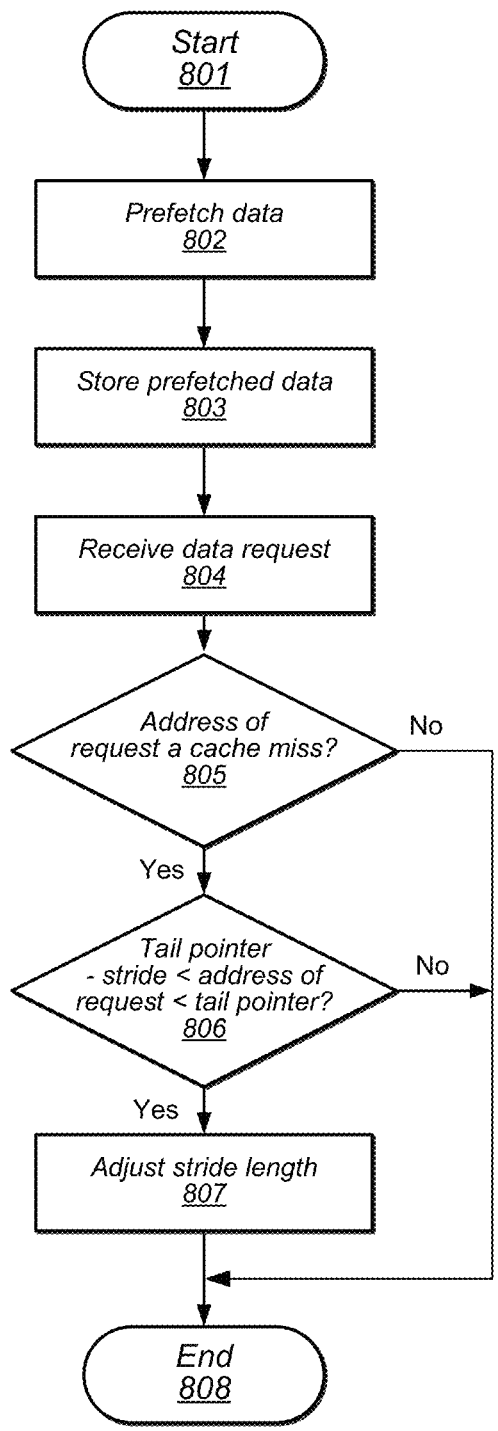
FIG. 8 is a flow diagram illustrating an embodiment of a method for adjusting a prefetch unit stride value.

Turning to FIG. 8, a method is illustrated for operating a prefetch buffer, such as, e.g., prefetcher 510 in FIG. 5. Referring collectively to FIG. 5 and the flowchart of FIG. 8, the method may begin in block 801.

Prefetcher 510 may read data from a memory such as memories 505 (block 802). If prefetcher 510 has previously fetched data, then the address for reading may be generated dependent upon a head pointer and stride value of prefetcher 510. Otherwise, if prefetcher 510 is prefetching its first value, then the address may have been determined by a prefetch learning table associated with prefetcher 510.

The data read by prefetcher 510 may be stored in a cache memory such as, for example, L1 cache 502 (block 803). In some embodiments, the read data may be stored in buffer memory included in prefetcher 510 before storing in L1 cache 502. Upon storing the read data, new values for the head pointer and a follow pointer may be determined.

L1 cache 502 may receive a request for data from a core, such as, e.g., core 501 (block 804). The request for data may arrive independently from memory prefetches executed by prefetcher 510. The data request may come from a process running on core 501. In some embodiments, core 501 may support several processes running concurrently, while, in other embodiments, L1 cache 502 may support more than one core, each core running one or more software processes. L1 cache 502 may determine if an address of the data request matches an address of a cache entry.

The method may depend on a determination if the request for data results in a cache miss (block 805). If the request for data results in a cache hit, i.e., L1 cache 502 determines a cache entry matches the address of the request, then the method may end in block 808. Otherwise, if L1 cache 502 determines the request is a cache miss, then L1 cache 502 may determine if the address of the request falls within a certain range of addresses.

If the data request was a cache miss, then the method may depend on the address of the data request (block 806). L1 cache 502 may determine if the address of the request is within one stride of the tail pointer, i.e., if the address of the request falls between the address in the tail pointer and the address of the tail pointer minus the value of the stride. If the address of the request does not fall within this range, then the method may end in block 808. Otherwise, the stride value may be adjusted in block 807.

If the address of the request was a cache miss and is within a stride value of the tail pointer, then prefetcher 510 may adjust the stride value dependent upon equation 1 (block 807). An occurrence of a memory request that results in a cache miss in which the address of the request is within a stride value of the tail pointer may be an indication that the stride value is not optimal and may be adjusted to improve efficiency. Under some conditions, an adjustment dependent upon equation 1 may correct the stride value to match a memory access increment of the software process requesting the data. Under other conditions, more than one stride value adjustment may be necessary before the stride value matches the memory access increment of the current software processes.

In some embodiments, prefetcher 510 may further adjust the stride value to be an integer multiple of a cache line size of L1 cache 502. In such embodiments, prefetcher 510 may select the integer multiple of the cache line size that is closest to the result of equation 1. In other such embodiments, prefetcher 510 may select the closest integer multiple of the cache line size that is greater than the result of equation 1. The value of the tail pointer and the value of the head pointer may also be adjusted based on the new stride value.

It is noted that the method illustrated in FIG. 8 is merely an example embodiment. Although the operations illustrated in the method in FIG. 8 are depicted as being performed in a sequential fashion, in other embodiments, some of the operations may be performed in parallel or in a different sequence. In some embodiments, additional operations may be included.

Numerous variations and modifications will become apparent to those skilled in the art once the above disclosure is fully appreciated. It is intended that the following claims be interpreted to embrace all such variations and modifications.

What is claimed is:

1. An apparatus, comprising:
 a first memory configured to store a table, wherein the table includes at least a first entry, wherein the first entry includes:
  an expected address of a next memory access; and
  an offset to adjust a value of the expected address for a subsequent memory access; and
 a control circuit coupled to the first memory, wherein the control circuit is configured to:
  read data at a predicted address in a second memory, wherein a value of the predicted address is dependent upon the value of the expected address and a value of the offset; and
  store the read data in a cache memory;
 a first address comparator configured to compare a received address value of a received memory access to the value of the expected address; and
 a second address comparator configured to compare the received address value of the received memory access to a value dependent upon the value of the expected address and the value of the offset;
 wherein the control circuit is further configured to generate a new value of the offset dependent upon an output of the first comparator and an output of the second comparator.

2. The apparatus of claim 1, wherein the control circuit is further configured to generate the new value of the offset responsive to a determination that the received address value of the received memory access resulted in a cache miss.

3. The apparatus of claim 2, wherein the control circuit is further configured to generate the new value of the offset dependent upon the received address value minus the value of the expected address plus the value of the offset.

4. The apparatus of claim 3, wherein the control circuit is further configured to generate the new value of the offset dependent upon a value that is an integer multiple of a cache line size in the cache memory.

5. The apparatus of claim 1, wherein the control circuit is further configured to update the value for the expected address responsive to generating the new value of the offset.

6. The apparatus of claim 1, wherein the control circuit is further configured to update the value for the predicted address responsive to generating the new value of the offset.

7. The apparatus of claim 1, wherein the new value of the offset is less than the value of the offset.

8. A method for operating a cache memory, comprising:
 reading data from a memory corresponding to a predicted address, wherein a value of the predicted address differs from a value of a previous predicted address by a value of an offset;
 storing the read data in the cache memory;
 receiving a memory access request from a processor coupled to the cache memory;
 perform a first comparison of a value of an address of the received memory access request to a value of an expected address of the received memory access request;
 perform a second comparison of the value of the address of the received memory access request to a value dependent upon the value of the expected address of the memory access request and the value of the offset; and
 generating a new value of the offset dependent upon a result of the first comparison and a result of the second comparison.

9. The method of claim 8, further comprising generating the new value of the offset dependent upon the value of the address of the received memory access request, the value of the expected address of the received memory access request, and the value of the offset.

10. The method of claim 9, further comprising generating the new value of the offset responsive to determining that the value of the address of the received memory access request results in a cache miss.

11. The method of claim 9, further comprising generating the new value of the offset dependent upon the value of the address of the received memory access request minus the value of the expected address plus the value of the offset.

12. The method of claim 11, further comprising generating the new value of the offset dependent upon an integer multiple of a cache line size of the cache memory.

13. The method of claim 8, further comprising updating the value of the expected address dependent upon the new value of the offset.

14. The method of claim 8, further comprising updating the value of the predicted address dependent upon the new value of the offset.

15. A system, comprising:
 one or more processors;
 a cache memory coupled to the one or more processors, wherein the cache memory is configured to store data for the one or more processors;
 one or more additional memories;
 a prefetch unit coupled to the cache memory and the one or more additional memories, wherein the prefetch unit is configured to:
  determine a value of an expected address of a next memory access by a given one of the one or more processors;
  determine a value of an offset to increment the value of the expected address for a subsequent memory access;

read data from a location in the one or more memories corresponding to a predicted address, wherein a value of the predicted address is dependent upon the value of the expected address and the value of the offset;
store the read data in the cache memory;
receive a memory access request from the given one of the one or more processors;
perform a first comparison of a value of an address of the received memory access request to the value of the expected address; and
generate a new value of the offset dependent upon the first comparison.

16. The system of claim 15, wherein the prefetch unit is further configured to:
perform a second comparison of the value of the address of the received memory access request to a value dependent upon the value of the expected address and the value of the offset; and
generate the new value of the offset dependent upon the first comparison and the second comparison.

17. The system of claim 16, wherein the prefetch unit is further configured to generate the new value of the offset responsive to a determination that the value of the address of the received memory access request results in a cache miss.

18. The system of claim 17, wherein the prefetch unit is further configured to generate the new value of the offset dependent upon the value of the address of the received memory access request minus the value of the expected address plus a current value of the offset.

19. The system of claim 18, wherein the prefetch unit is further configured to generate the new value of the offset dependent upon an integer multiple of a cache line size in the cache memory.

20. The system of claim 15, wherein the prefetch unit is further configured to generate a new value of the expected address and a new value of the predicted address responsive to generating the new value of the offset.

* * * * *